(12) United States Patent
Knierim et al.

(10) Patent No.: US 9,789,697 B1
(45) Date of Patent: Oct. 17, 2017

(54) FLUID LEVEL SENSOR WITH COMBINED CAPACITANCE AND CONDUCTANCE

(71) Applicant: XEROX CORPORATION, Norwalk, CT (US)

(72) Inventors: David L. Knierim, Wilsonville, OR (US); Steven Ross Slotto, Camas, WA (US); Blake Terry Weimer, Woodburn, OR (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/220,686

(22) Filed: Jul. 27, 2016

(51) Int. Cl.
*B41J 2/175* (2006.01)
*G01F 23/24* (2006.01)
*G01F 23/26* (2006.01)

(52) U.S. Cl.
CPC .......... *B41J 2/17566* (2013.01); *G01F 23/24* (2013.01); *G01F 23/266* (2013.01); *B41J 2002/17579* (2013.01)

(58) Field of Classification Search
CPC   B41J 2/17566; B41J 2/17573; B41J 2/17579; B41J 2002/17576; G01F 23/24; G01F 23/266
See application file for complete search history.

(56) References Cited

U.S. PATENT DOCUMENTS

| | | | | |
|---|---|---|---|---|
| 4,947,689 A * | 8/1990 | Hochstein | ............. | G01F 23/268 331/65 |
| 5,051,759 A * | 9/1991 | Karita | ................. | B41J 2/17566 347/7 |
| 5,465,619 A * | 11/1995 | Sotack | ................. | G01F 23/265 118/694 |
| 6,155,664 A * | 12/2000 | Cook | ................... | B41J 2/17509 347/19 |
| 6,209,980 B1 * | 4/2001 | Kobayashi | .......... | B41J 2/17513 347/7 |
| 7,059,696 B2 * | 6/2006 | Eguchi | ................ | B41J 2/17566 347/19 |

* cited by examiner

*Primary Examiner* — Anh T. N. Vo
(74) *Attorney, Agent, or Firm* — Marger Johnson

(57) ABSTRACT

A fluid sensor has a first electrode, a second electrode, a housing containing the first and second electrodes, such that the electrodes extend from the housing, exposed metal between the first and second electrodes, and a drive signal electrically connected to the second electrode, such that when fluid is present in the reservoir, either the first electrode senses the presence of the fluid, or the drive signal senses presence of the fluid. A fluid sensor has a first electrode, a second electrode, a housing containing the first and second electrodes, a drive signal electrically connected to the second electrode, and sensing circuitry to measure a current from the second electrode to indicate a fluid level.

13 Claims, 5 Drawing Sheets

FLUID LEVEL SENSOR WITH COMBINED CAPACITANCE AND CONDUCTANCE

FIELD OF THE INVENTION

This disclosure relates to fluid level sensors, more particularly to fluid level sensors employing capacitance or conductance to sense levels.

BACKGROUND

Many different devices employ fluid level sensors to detect fluid levels in reservoirs. The detection may trigger automated fluid replenishment, be included in status reports, or may only report when levels get low and need replenishing, as examples. One such application involves sensing the levels in ink reservoirs used in printing systems. While this is one example, the ink sensing application demonstrates some of the issues with current sensors.

One issue that occurs in this area results from the wide array of print systems that use a similarly wide array of inks. Inks may consist of many different materials and many different combinations of these materials, all with differing characteristics. For example, different inks have different conductivity properties. Conductive-based ink level sensors have worked well when designed for specific inks used in specific products. For example, some of these inks have an electrical conductivity range of 10:1 across manufacturing lots and use conditions. However, in the wider uses covering multiple ink chemistries, the conductivity range may exceed 1000000:1.

Some products use self-heating thermistor probes. However, these may show false empty readings with heated incoming ink. The heat from the probe may also degrade certain UV sensitive inks. More than likely, one type of thermistor probe will not work across ranges of ink types and characteristics.

Other products employ optical ink level sense probes. These probes may degrade at the high temperatures used for some meltable inks. They also may get coated with ink pigments, and generally have poor signal differentiation between full and empty signals on highly loaded white pigmented inks.

Still other products use capacitive ink level sensing. This works well for non-conductive through moderately-conductive inks. Highly conductive inks, especially in metal reservoirs or tanks, can cause problems. Thin films of ink coating the probe can cause false full readings. False empty readings can also occur if ink shorts the probe signals to the reservoir housing.

The ability to provide and use a single type of sensor that can operate in different types of inks across a wide range of temperatures would be useful.

SUMMARY

One embodiment consists of a fluid sensor has a first electrode, a second electrode, a housing containing the first and second electrodes, such that the electrodes extend from the housing, exposed metal between the first and second electrodes, and a drive signal electrically connected to the second electrode, such that when fluid is present in the reservoir, either the first electrode senses the presence of the fluid, or the drive signal senses presence of the fluid.

Another embodiment is a fluid sensor has a first electrode, a second electrode, a housing containing the first and second electrodes, a drive signal electrically connected to the second electrode, and sensing circuitry to measure a current from the second electrode to indicate a fluid level.

DETAILED DESCRIPTION OF THE EMBODIMENTS

Figure 1:
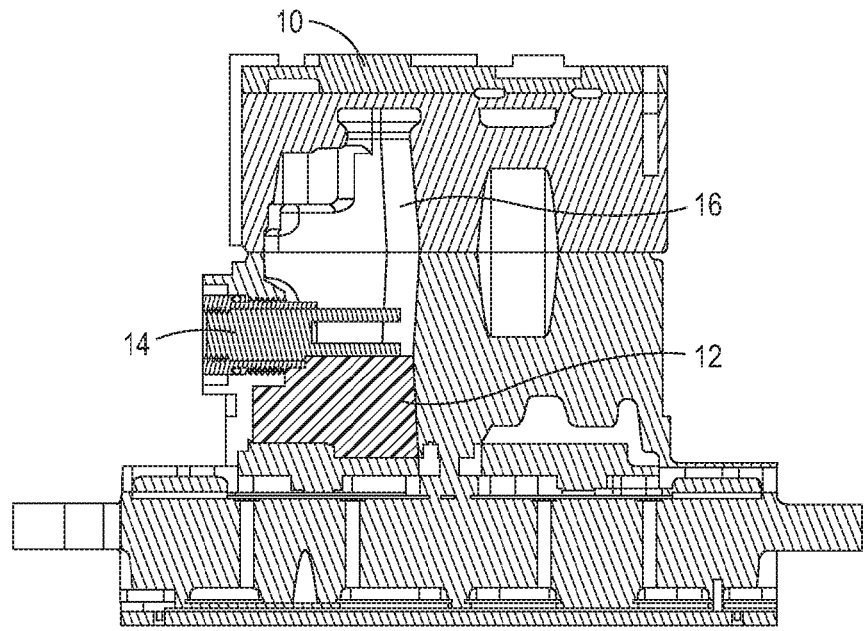
FIG. 1 shows a side view of a fluid reservoir with a level sense probe.

FIG. 1 shows an embodiment of a fluid reservoir housing 10. In this particular embodiment, and in the discussion here, many of the examples will include ink reservoirs used in printers. However, one should note that the embodiments here apply to many different types of fluid level sensors.

The fluid reservoir housing 10 includes a reservoir 16 that holds a level of ink or other fluid 12. A fluid level sensor 14 has its own housing, discussed in more detail later, from which extend two electrodes. The electrodes extend into the fluid. The resulting voltages and currents detected from the electrodes allow the system to determine the presence or absence of fluid, and depending upon the nature of the sensing system, the amount of ink available.

Figure 2:
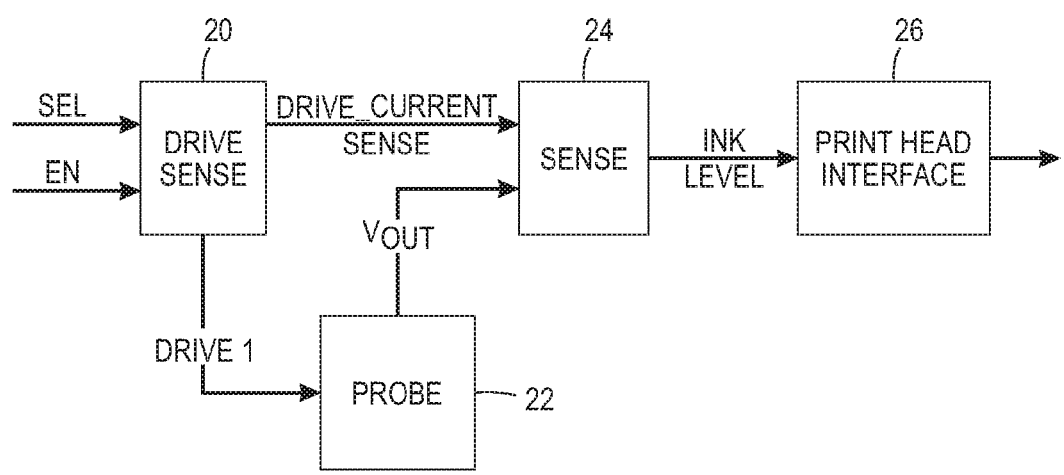
FIG. 2 shows a block diagram of an embodiment of an ink sensing system.

The fluid level sensor embodiment of FIG. 2 has two parts. The first part is a very small circuit board within the sensor housing, and the second part will typically reside in the fluid system electronics of the main system. The second part may reside in the housing 10 or in an electronics module in the printer or fluid dispensing system itself. In the embodiment of FIG. 2, the probe circuitry 22 resides in the sensor housing and the drive sense circuitry 20 and the sensing circuitry 24 reside separate from the sensor housing.

Figure 4:
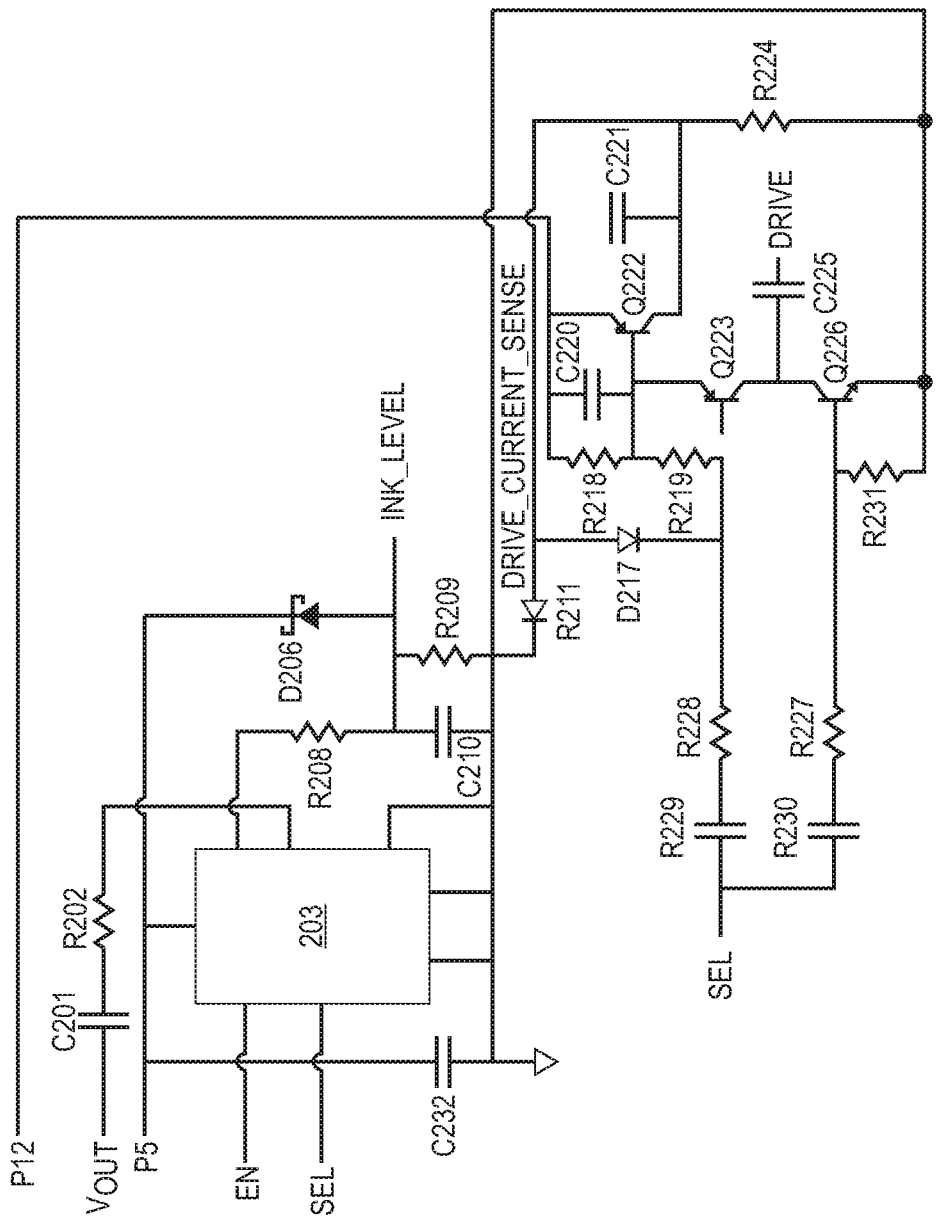
FIG. 4 shows a schematic of an embodiment of a drive and sense circuit.

The drive sense circuitry 20 receives a select (SEL) and an enable (EN) signal shown in FIG. 4 that generates a drive signal that is electrically connected to the upper electrode and provides a drive signal DRIVE. The drive sense circuitry 20 also provides a Drive_Current_Sense signal indicating when excess current is being drawn from the DRIVE signal. The probe 22 generates a voltage based upon the ink in the reservoir and sends the resulting voltage, Vout, to the sensing circuitry 24. The amplitude on Vout increases when ink is contacting both electrodes of probe 22 (full condition) due to ink capacitance or conductivity. In the case of highly-conductive ink in a grounded metal reservoir, Vout may be low due to loading of the DRIVE signal. In this case, Drive_Current_Sense will trigger the ink full condition. The sensing circuitry produces an ink level signal based on sensing either a high-amplitude signal on Vout or a high level on Drive_Current_Sense.

The issues with using Vout alone, as in a typical capacitive or conductive fluid level sense system, arises when the fluid has high conductivity. When lower conductivity liquids are present in the reservoir, the drive signal couples capacitively or conductively to the sense electrode resulting in an ink full signal. For high conductivity inks in current embodiments, currently available ink sensors may cause false empty or full readings. In the embodiments here, when high conductivity ink reaches the upper electrode, it short circuits the upper electrode to ground, especially in the case of metal reservoirs. This high load current on the upper electrode is also sensed and causes a full reading. In some embodiments, high conductivity inks are those that conduct more than 500 microsiemens per centimeter, and those that conduct less are considered low conductivity inks. The thresholds for high and low conductivity may be left up to the system designer.

In the empty condition, a film of fluid may remain coating the level sense probe assembly. In the case of high conductivity fluid, this film can form a conductive path between the electrodes, causing a false full reading. To avoid this issue, exposed grounded metal 40 is interposed between the two electrodes. Conductivity of any remaining ink film is shunted to ground, preventing any false full reading.

Figure 3:
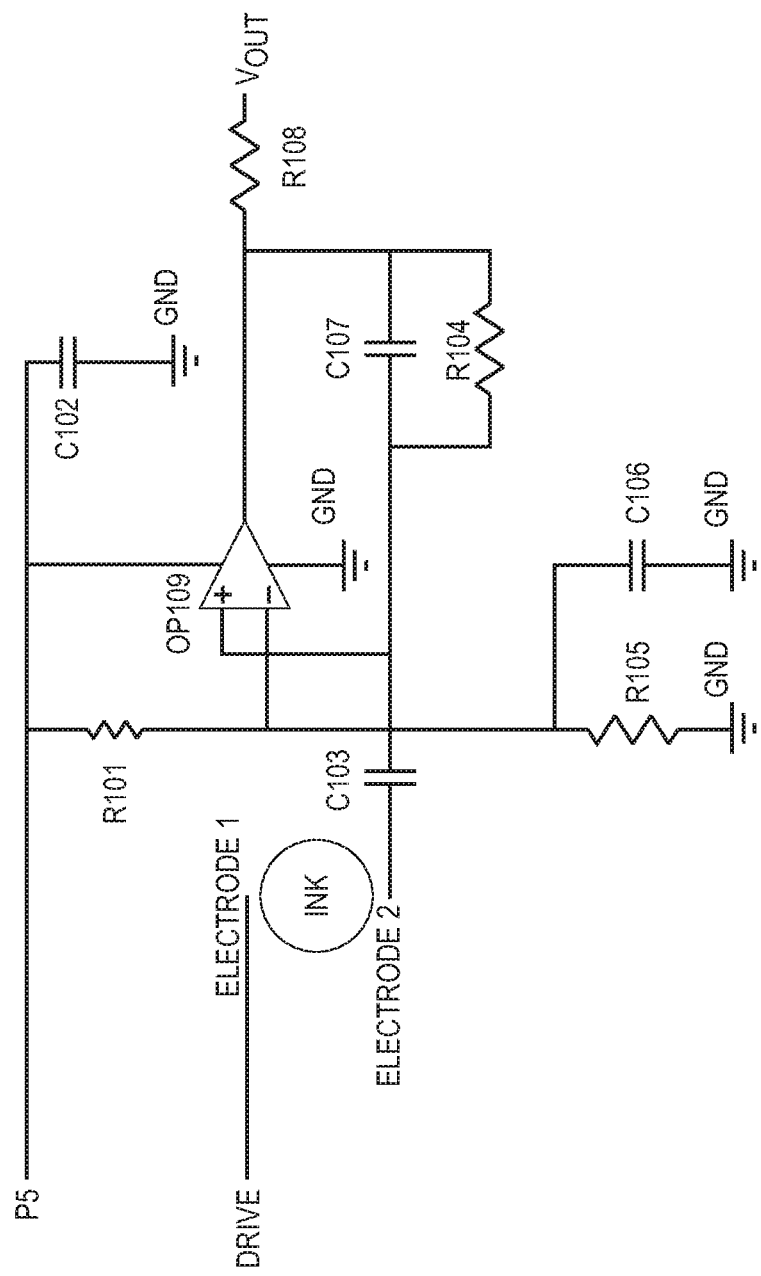
FIG. 3 shows a schematic of an embodiment of a probe circuit.

FIG. 3 shows an embodiment of circuitry for the sensor. As mentioned above, the two electrodes are arranged such that the 'upper' electrode is positioned higher than the lower electrode relative to any fluid in the reservoir. The upper electrode receives the drive signal from the drive circuitry discussed later with regard to FIG. 4. The ink 12 causes the signal to couple to the lower electrode. The operational amplifier OP109 buffers the high-impedance sense electrode signal. P5 is the positive voltage supply to provide power to the op amp OP109. The various capacitors and resistors such as C103, R101, C102, R105, C105 and RC filter C107 and R104 provide signal conditioning and control for the output signal, Vout.

FIG. 4 shows one embodiment of drive and sense circuitry to use in conjunction with probe circuitry of FIG. 3. The drive and sense circuitry of FIG. 4 could be used with any probe circuit with two electrodes that can capacitively or conductively couple through the ink or short to ground, depending upon the conductivity of the ink. This is just one example of such a circuit. In FIG. 4, the lower block of circuitry generates the drive signal, and the upper block receives the Vout signal and produces the Ink_Level signal that will eventually be sent to the print head or other fluid dispensing system.

The drive section receives a select signal SEL. In this embodiment, the SEL signal consists of a square wave. There is also an enable signal, EN, that also consists of a square wave having a frequency twice that of the SEL signal. EN causes analog multiplexer 203 to sample Vout only during the second half of each SEL signal state, after DRIVE and Vout have settled. The SEL and EN signals control analog multiplexer 203. Every time SEL changes state (from high to low or low to high), EN goes false for the first half of that SEL state, causing the analog multiplexer 203 to be open-circuit. During the second half of the SEL low state, analog multiplexer 203 connects R202, which is the capacitively-coupled version of Vout, to ground. During the second half of the SEL high state, analog multiplexer 203 connects R202 to R208, charging or discharging C210, resulting in the Ink_Level signal to a level determined by the amplitude of Vout. The DRIVE signal is an amplified and inverted version of the SEL signal, unless the fluid in the reservoir is a high conductivity ink in the full state. The circuit block amplifies the SEL signal to generate the DRIVE signal, which is electrically coupled to Electrode 1 from FIG. 3.

As discussed above, the DRIVE signal is provided to the probe circuit, which returns the Vout signal. In the embodiment of FIG. 4, the Vout signal is synchronously rectified to form the Ink_Level signal. Synchronous rectification accurately measures the amplitude of Vout while rejecting transients and noise sources at other frequencies, such as 50 or 60 Hz power-line interference. Vout is capacitively-coupled to input 1Z of a single throw double pole (STDP) analog multiplexer or switch 203. The multiplexer 203 also receives the EN and SEL signals, as well as the positive voltage supply P5 and ground GND. The outputs of the multiplexer are 1Y1 and 1Y0.

Output 1Y0 connects 1Z to ground during the second half of the low state of SEL, which is the high state of DRIVE and the low state of Vout. Output 1Y1 connects to 1Z during the second half of the high state of Vout, sampling its amplitude into capacitor C210 to form the Ink_Level signal. If no ink is coupling the two electrodes, the amplitude of Vout is low, resulting in a low voltage on C210 and the Ink_Level signal. If ink is bridging the two electrodes, and not so highly conductive so as to short the DRIVE signal, then the amplitude on Vout will be higher, resulting in a high voltage on C210 and the Ink_Level signal.

If the ink is highly conductive ink, DRIVE draws enough current to turn on transistor Q222. The collector of Q222, through diode D211 and resistor R209, pulls signal Ink_Level high, indicating a full condition, even when the amplitude of the Vout signal is low. Otherwise, the high conductivity inks cause a short and the signal never reaches the lower electrode, resulting in a false empty reading.

Figure 5:
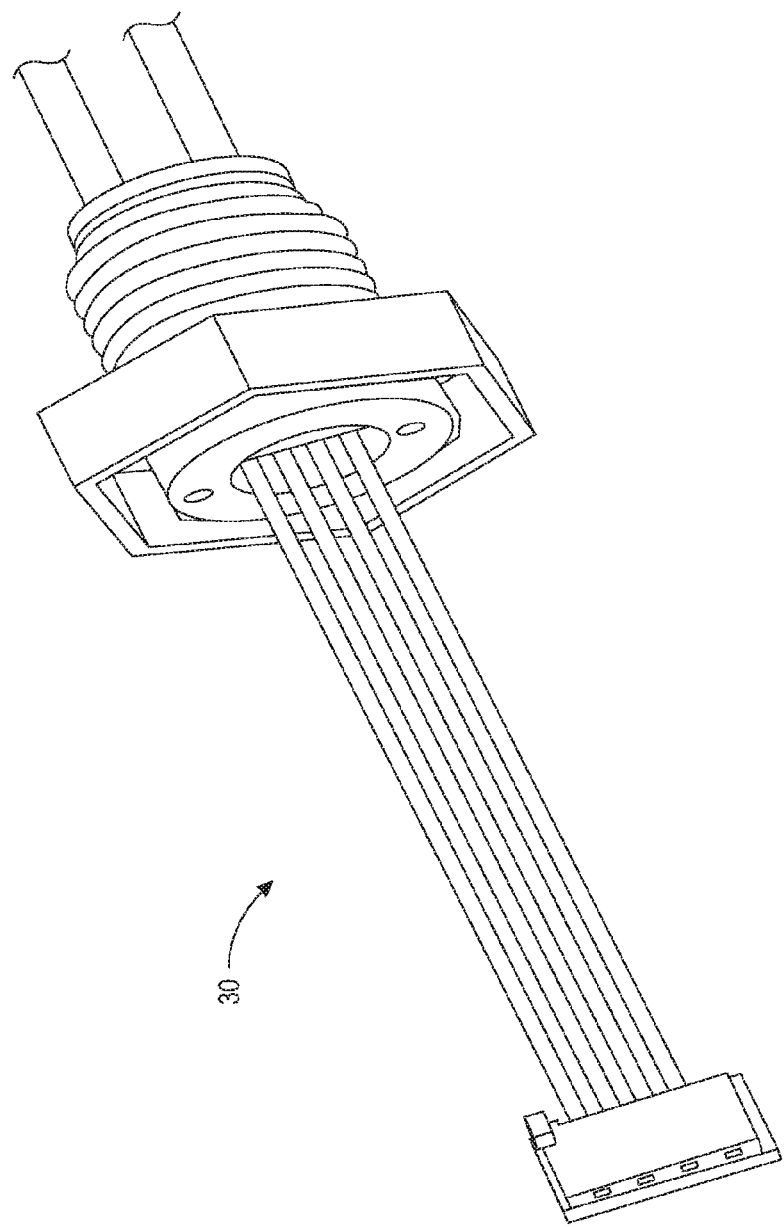
FIG. 5 shows an embodiment of a fluid probe.
Figure 6:
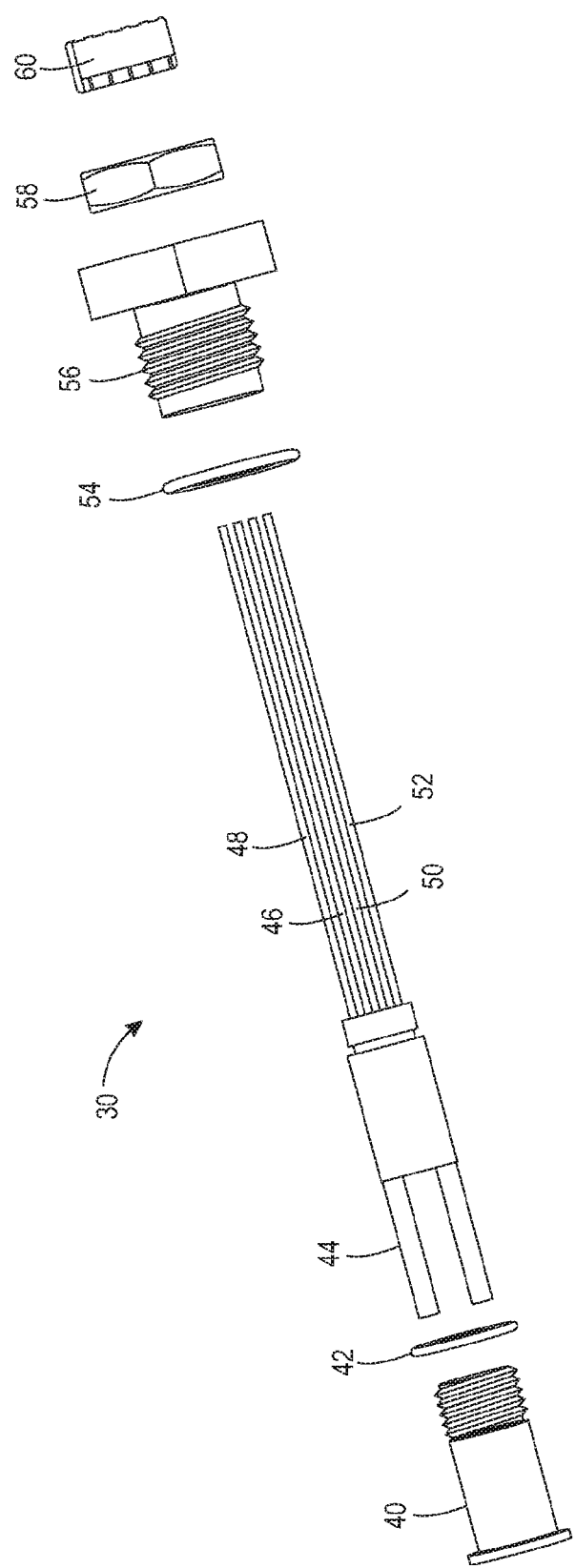
FIG. 6 shows a more detailed view of an embodiment of a fluid level sensor.

FIG. 5 shows a view of a completely assembled fluid level sensor. FIG. 6 shows an exploded view of the fluid level sensor. In this embodiment it consists of grounded metal housing insert 40, and an insert o-ring 42. The electrodes 44 insert through the housing insert into the ink. The four lines may occur in any location and order. In the embodiment here, the line 46 is the drive signal line, line 48 is the Vout line. Line 50 is the ground wire and line 52 is the positive power supply line. The other end of the fluid level sensor is a body o-ring 54, the body 56, a nut 58 and a connector 60.

The electrodes are inserted into the ink, and the signals are routed in and out of the chassis of the ink reservoir or the fluid dispensing system. In some embodiments, the electrodes were roughly 13 mm long and 2.2 mm wide with a 3 mm gap between them. The drive and sensing electrode pads extend from 2 mm outside the grounded housing to 0.1 mm from the ends of the electrodes. This particular geometry is designed to prevent ink bridging between the electrodes, except for any remaining ink film that by necessity must pass over grounded housing metal on its way from one electrode to the other. The drive signal is a 9V peak-to-peak alternating current voltage.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A fluid sensor, comprising:
   a first electrode;
   a second electrode;
   a housing containing the first and second electrodes;
   drive sense circuitry to generate a drive signal, the drive signal electrically connected to the second electrode; and
   sensing circuitry to measure a current from the second electrode to generate a signal to indicate a fluid level, and to receive a drive sense signal, such that when the current from the second electrode would indicate a low level as result of conductive ink, the drive sense signal will cause the signal to indicate a high level.

2. The fluid sensor of claim 1, wherein the sensing circuitry also receives a voltage from the first electrode to indicate the fluid level.

3. The fluid sensor of claim 2 where the second electrode is above the first electrode relative to the level of fluid in a reservoir.

4. The fluid sensor of claim 2, including an exposed grounded surface at the base of the electrodes.

5. The fluid sensor of claim 2, wherein the drive signal further comprises an alternating current voltage.

6. The fluid sensor of claim 2, wherein the sensing circuitry includes a synchronous rectifier.

7. The fluid sensor of claim 1, wherein the sensing circuit also receives a current from the first electrode to indicate the fluid level.

8. A fluid sensor, comprising:
a first electrode;
a second electrode;
a housing containing the first and second electrodes, such that the electrodes extend from the housing, the housing to be inserted into a fluid;
an exposed piece of metal between the first and second electrodes, the exposed metal piece being grounded and positioned to be exposed to the fluid; and
a drive signal electrically connected to the second electrode, such that when fluid is present in the reservoir, either the first electrode senses the presence of the fluid, or the drive signal senses presence of the fluid.

9. The fluid sensor of claim 8, further comprising drive circuitry to generate and monitor the drive signal.

10. The fluid sensor of claim 8, further comprising circuitry to convert a voltage received from the first electrode to an ink level signal.

11. The fluid sensor of claim 8, wherein the exposed metal between the first and second electrodes is coupled to electrical ground.

12. The fluid sensor of claim 8, wherein the second electrode is above the first electrode relative to the level of fluid in a reservoir.

13. The fluid sensor of claim 8, wherein fluid presence is indicated when either the voltage of the first electrode is high or when the current of the drive signal is high.

* * * * *